United States Patent
Sun et al.

(10) Patent No.: US 6,763,800 B1
(45) Date of Patent: Jul. 20, 2004

(54) DIAGNOSING PROPER OPERABILITY OF A CYLINDER CHARGE MOTION CONTROL DEVICE

(75) Inventors: Jing Sun, Bloomfield, MI (US); Julia Helen Buckland, Dearborn, MI (US); Diana Dawn Brehob, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2 days.

(21) Appl. No.: 10/248,792

(22) Filed: Feb. 19, 2003

(51) Int. Cl.[7] ............................ F02B 31/00; F02D 41/22
(52) U.S. Cl. ........................ 123/306; 123/399; 123/676; 123/90.15
(58) Field of Search ................................ 123/399, 306, 123/676, 90.11, 90.15, 90.16, 90.17; 73/118.2, 118.1; 701/107

(56) References Cited

U.S. PATENT DOCUMENTS

| | | | | |
|---|---|---|---|---|
| 6,135,085 A | * | 10/2000 | Toyohara et al. | 123/306 |
| 6,401,675 B1 | * | 6/2002 | Nakamura et al. | 123/90.15 |
| 6,505,586 B1 | * | 1/2003 | Sato et al. | 123/90.17 |
| 6,575,133 B2 | * | 6/2003 | Ries-Mueller et al. | 123/306 |
| 6,675,639 B1 | * | 1/2004 | Schricker et al. | 73/118.1 |
| 6,687,601 B2 | * | 2/2004 | Bale et al. | 701/108 |
| 6,711,492 B1 | * | 3/2004 | Pursifull et al. | 701/114 |

* cited by examiner

*Primary Examiner*—Hai Huynh
(74) *Attorney, Agent, or Firm*—Diana D. Brehob

(57) ABSTRACT

A method for detecting improper operation of a charge motion control device (CMC) based on exhaust temperature is disclosed. It has been found that when the charge motion control device is switched between two positions, the exhaust temperature changes by as much as 100 degrees C. The expected exhaust temperature, based on commanded charge motion control device position and current engine operating condition, and the measured exhaust temperature are compared to determine whether the charge motion control device has failed to attain the desired position.

29 Claims, 3 Drawing Sheets

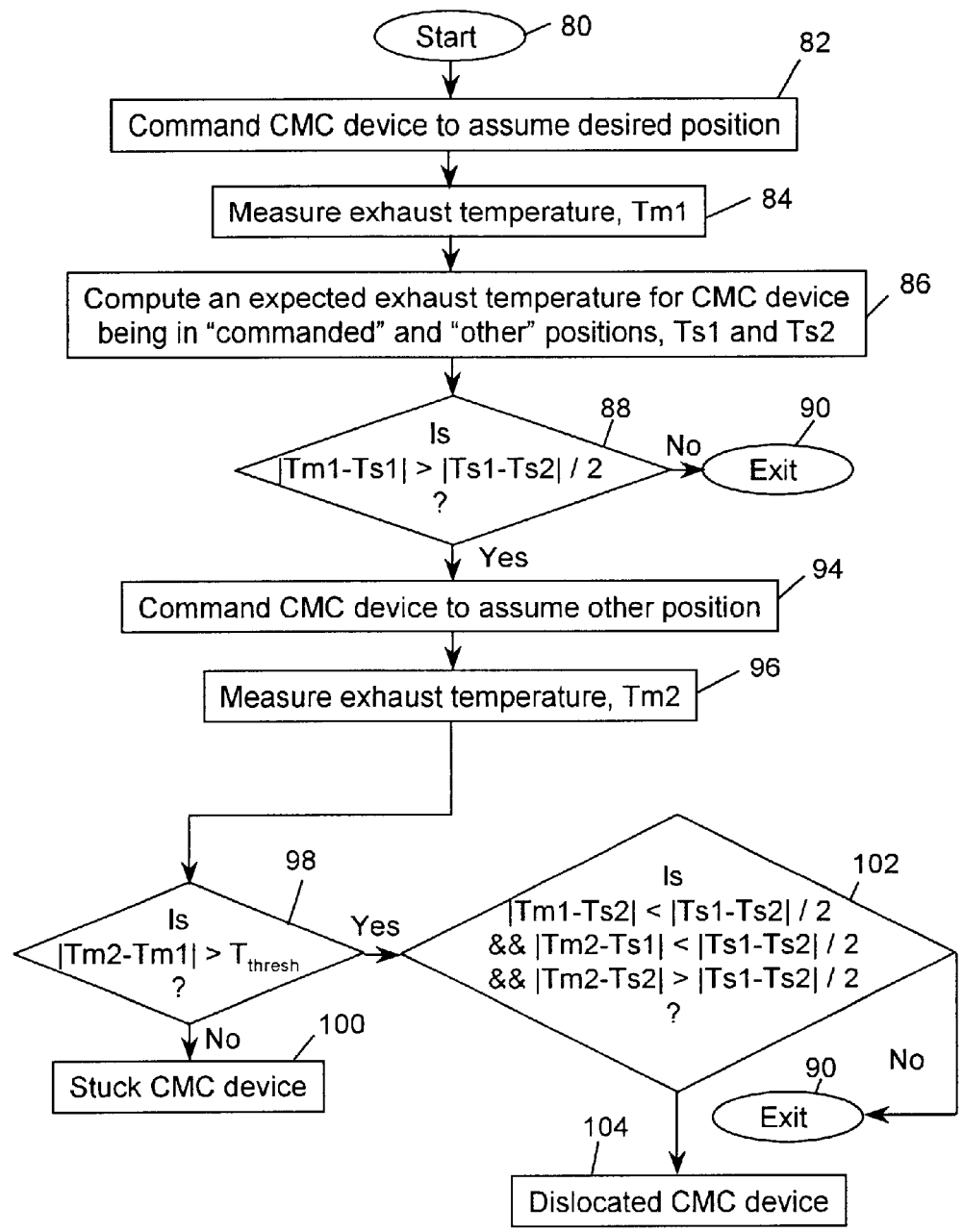

DIAGNOSING PROPER OPERABILITY OF A CYLINDER CHARGE MOTION CONTROL DEVICE

BACKGROUND OF INVENTION

1. Field of the Invention

The invention relates to internal combustion engines and more particularly to methods and systems for diagnosing proper operability of air or air-fuel mixture, referred to herein as charge, motion control (CMC) devices used in such engines. Still more particularly, the invention relates to cam profile switching mechanisms and swirl control valves used in such engines to provide such charge motion.

2. Background Information

As is known in the art, charge motion control devices (CMCs) are used to provide greater combustion stability over a wider range of operation in internal combustion engines. One such charge motion device is a cam profile (CPS) switching mechanism. For example, cam profile switching is a mechanism by which the cam operating an intake valve of the engine is changed from following a first cam to following a second cam, such change occurring in about one engine revolution. This switching action results in the generation of charge motion in the cylinder.

As is also known in the art, at marginal combustion conditions, e.g., with lean air/fuel mixtures in the cylinder or air/fuel mixture diluted with a large fraction of exhaust gases in the cylinder, it is desirable to have a high air/fuel motion turbulence level to aid in the ignition produced flame propagating through the cylinder. At more robust combustion conditions, such as those that occur at high torque demand, high turbulence causes harsh, noisy combustion in the cylinder due to the flame propagating too fast thereby causing an excessive rate of pressure rise in the cylinder. With a CPS device, the cam can be switched to provide the appropriate charge motion in the cylinder, thereby conforming to the engine operating condition.

The inventors of the present invention have recognized the desirability of confirming that the charge motion control device is operating as expected. Since CPS affects primarily charge delivery, it is natural to attempt to determine CPS integrity based on a charge model. However, the inventors of the present invention have discovered that engineering data show little or no sensitivity in charge data to CPS position at part load.

SUMMARY OF INVENTION

The inventors of the present invention have observed that when CPS position is changed from one cam to the other, at a constant engine operating condition, engine exhaust temperature changes by 50 to 100 degrees Celsius, depending on engine operating condition. The inventors have discovered that a determination can be made as to whether a charge motion (CMC) device is operating properly by comparing actual exhaust temperature with exhaust temperature expected from operating the engine with the CMC device in a predetermined one of at least two different charge motion generating positions.

The exhaust temperature difference that is noticed when the CMC device is in the other of the positions than is expected is due to the fact that when the electronic control unit commands a first position, the electronic controller also commands spark timing, fuel injection, exhaust gas recirculation quantity, and other parameters assuming that the CMC device has, indeed, assumed the commanded position. If the CMC device is inoperable and is in the other position than that commanded, but the electronic control unit commands the other engine parameters for the appropriate positioning of the CMC device, then the values of the engine parameters are inappropriate for the actual CMC device position, thus, yielding the rather substantial difference in exhaust temperature from that expected, i.e., a 50–100 degree Celsius differential.

The inventors have also discovered that if the CMC device has been found to operating improperly, information about the improper operation can also be assessed. By comparing both measured exhaust temperatures and expected temperatures with the CMC commanded to be in a first one of the positions and then with the CMC commanded to be in the other position, such an assessment can be made.

The inventors disclose a method for detecting a proper operability in a charge motion control device in an internal combustion engine, the charge motion control device being capable of assuming one of at least two positions. The method includes commanding the charge motion control device to assume one of the two positions. The method determines a measured exhaust temperature, $Tm1$. The method also determines a first expected exhaust temperature, $Ts1$, based on a present engine operating condition and the position commanded to the charge motion control device. The method provides detection of improper operability in response to the measured temperature and said first expected exhaust temperature. Further, a second expected exhaust temperature, $Ts2$, based on a present engine operating condition and the charge motion control device being in the other of the two positions is determined. The improper operability is detected based also on the second expected exhaust temperature. Additionally, the charge motion control device is commanded to assume such other position. A second measured exhaust temperature, $Tm2$, is measured in response to commanding the charge motion control device to be in the other position. The improper operability detection is further based on $Tm2$.

The inventors also disclose a system for detecting an improper operating charge motion control device disposed in an internal combustion engine. The charge motion control device is capable of assuming a first position and a second position. The system includes a temperature sensor disposed in an engine exhaust and an electronic control unit operably coupled to the charge motion control device, the engine, and the temperature sensor. The electronic control unit commands the charge motion control device to assume the first position. The electronic control unit determines a first expected exhaust temperature, $Ts1$, based on a present engine operating condition and the charge motion control device being in the first position. The electronic control unit detects the improper operation based on the first expected exhaust temperature and a measured temperature, $Tm1$, determined from the temperature sensor. The electronic control unit determines a second expected exhaust temperature, $Ts2$, based on the present engine operating condition and the charge motion control device being in the second position and bases the improper operation detection further on $Ts2$.

The present invention provides a robust method for detecting improper operation of a charge motion control device based on a signal from a temperature sensor in the engine exhaust.

Another advantage of the present invention is that it provides differentiation between a dislocated and a stuck charge motion control device. A stuck device is one that is stuck in an unknown position, i.e., could be in the first position, the second position or any position in between. A dislocated device is one that is in the second position when it is commanded to the first position or vice versa.

Another advantage of the invention is that the method provides several levels of error checking provided to prevent a false indication that an error has occurred.

BRIEF DESCRIPTION OF DRAWINGS

These and other advantages will be more fully understood by reading an example of an embodiment in which the invention is used to advantage, referred to herein as the Detailed Description, with reference to the drawings wherein:

FIG. 3 is a flowchart illustrating a method according to the present invention and used with the engine of FIG. 1.

DETAILED DESCRIPTION

Figure 1:
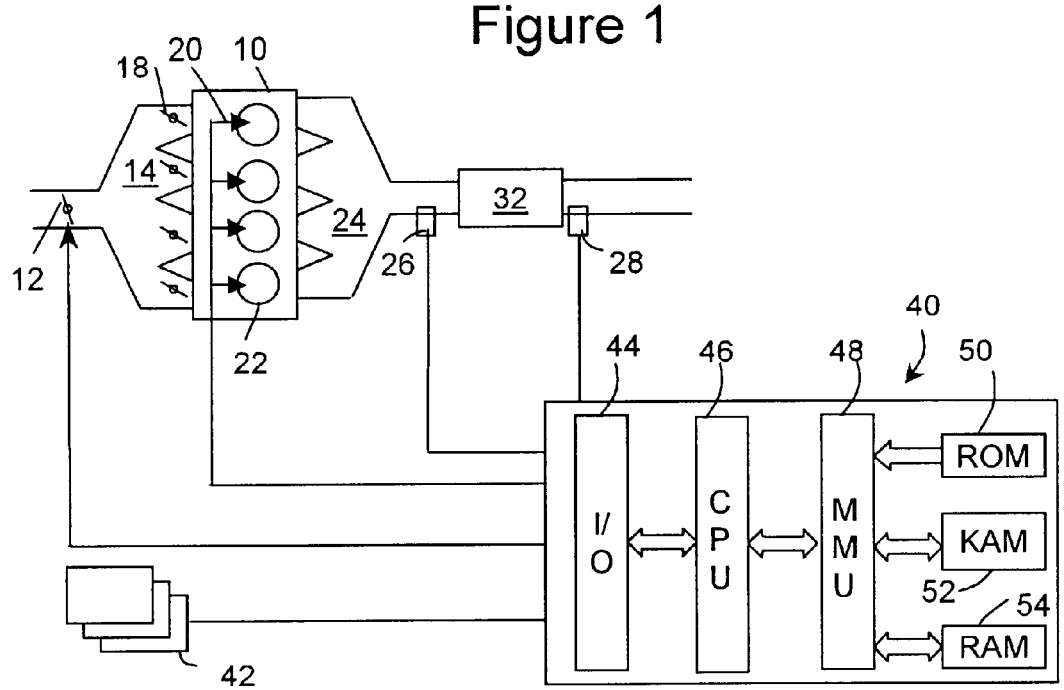
FIG. 1 is a schematic of an internal combustion engine having charge motion control devices.

Referring now to FIG. 1, an internal combustion engine 10 is shown. Engine 10 is supplied air through intake manifold 14 with throttle valve 12 to control airflow to engine 10. Typically, engines are equipped an exhaust gas recirculation (EGR) system (not shown) which has an EGR duct leading from the engine's exhaust system to the intake system. Gases flow though the duct due to pressure in the intake being less than that in the exhaust. Flow through the EGR system is controlled by an EGR valve (not shown).

A fuel injector 20 supplies fuel into cylinder 22 of engine 10, such an arrangement is commonly called direct injection. Alternatively, fuel injector 20 is placed in an intake manifold 14 and supplies fuel into the intake manifold; such a system is commonly referred to as port fuel injection.

Manifold 14 has an air motion (i.e., charge motion) control plate 18 in each of the runners leading to cylinders 22. When charge motion control plate 18 is partially closed, turbulence is induced into the airflow as it passes the restriction. An alternative not shown in FIG. 1 is an engine having two intake valves per cylinder 22 with two runners to supply air to the two intake valves. A swirl control plate is placed in one of the two runners. At low speed, low torque engine operating conditions, the swirl control throttle is closed causing the bulk of the airflow to travel through the open runner. This approximately doubles the airflow rate through the open runner, thereby roughly doubling the turbulence level. Additionally, because the flow enters cylinder 22 through one intake valve, thus, asymmetrically a swirling flow is induced into the in-cylinder air/fuel mixture. Both a charge motion control plate 18 and a swirl control plate can be used as two-position devices and fully variable devices. In either case, these devices produce charge motion in the engine cylinders.

Here, in this example, a two-position application of these fully variable devices will be described. Furthermore, the present invention can be used to diagnose problems with fully variable devices by conducting the diagnostic procedure for example at two positions, preferably, the two extreme positions of the fully variable device.

Continuing to refer to FIG. 1, exhaust from cylinders 22 is exhausted through exhaust manifold 24. An exhaust component sensor 26 is disposed in the exhaust gas stream. In one embodiment, exhaust component sensor 26 is an exhaust gas oxygen sensor, from which an air-fuel ratio of the exhaust gases can be determined. Exhaust gas aftertreatment device 32 is disposed in the intake duct. Exhaust temperature sensor 28 is shown in FIG. 1 to be located downstream of exhaust gas aftertreatment device 32. Alternatively, it can be located anywhere in the exhaust duct or exhaust manifold 24.

Continuing to refer to FIG. 1, electronic control unit (ECU) 40 is provided to control engine 10. ECU 40 has a microprocessor 46, called a central processing unit (CPU), in communication with memory management unit (MMU) 48. MMU 48 controls the movement of data among the various computer readable storage media and communicates data to and from CPU 46. The computer readable storage media preferably include volatile and nonvolatile storage in read-only memory (ROM) 50, random-access memory (RAM) 54, and keep-alive memory (KAM) 52, for example. KAM 52 may be used to store various operating variables while CPU 46 is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 46 in controlling the engine or vehicle into which the engine is mounted. The computer-readable storage media may also include floppy disks, CD-ROMs, hard disks, and the like. CPU 46 communicates with various sensors and actuators via an input/output (I/O) interface 44. Examples of items that are actuated under control by CPU 46, through I/O interface 44, are swirl control valve position, position of camshaft (cam profile position), fuel injection timing, fuel injection rate, fuel injection duration, throttle valve position, spark plug timing (in the event that engine 10 is a spark-ignition engine), and others. Sensors 42 communicating input through I/O interface 44 may be indicating piston position, engine rotational speed, vehicle speed, coolant temperature, intake manifold pressure, accelerator pedal position, throttle valve position, air temperature, exhaust temperature, exhaust stoichiometry, exhaust component concentration, and air flow. Exhaust component sensor 26 is preferably an exhaust gas oxygen sensor. Some ECU 40 architectures do not contain MMU 48. If no MMU 48 is employed, CPU 46 manages data and connects directly to ROM 50, RAM 54, and KAM 52. Of course, the present invention could utilize more than one CPU 46 to provide engine control and ECU 40 may contain multiple ROM 50, RAM 54, and KAM 52 coupled to MMU 48 or CPU 46 depending upon the particular application.

Figure 2:
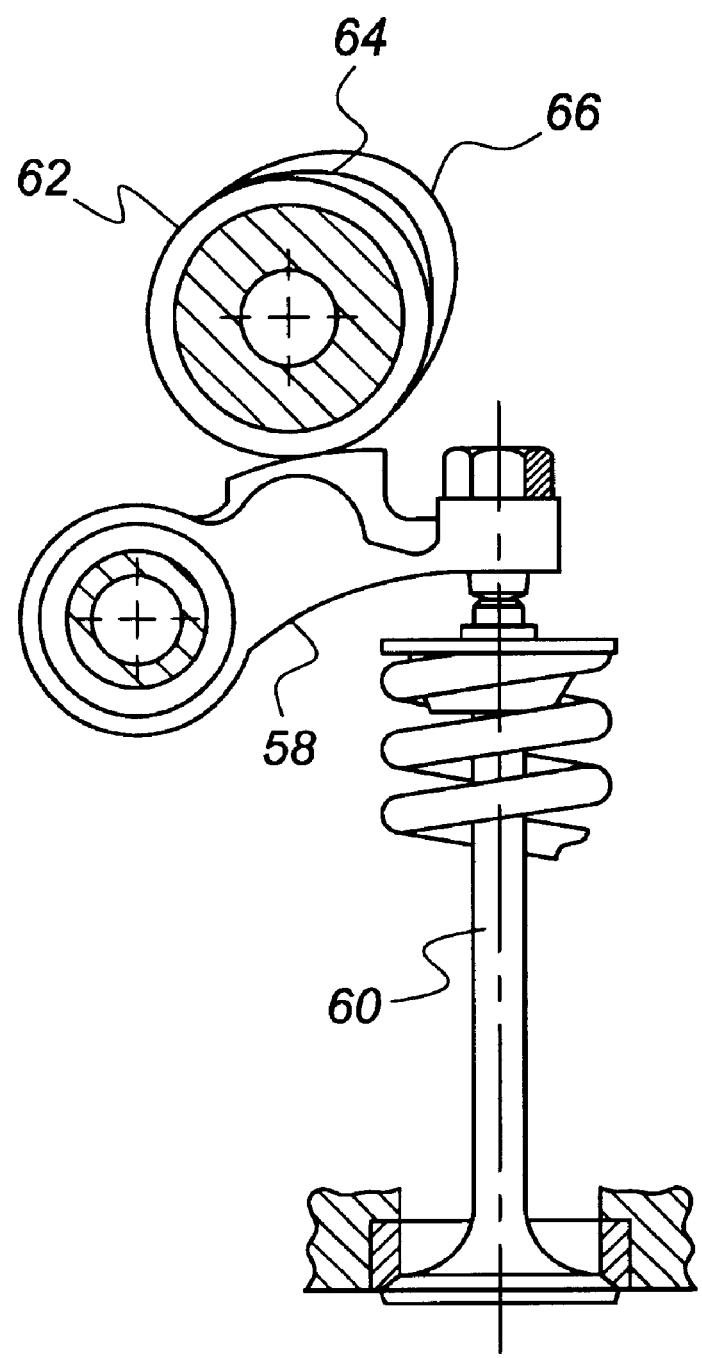
FIG. 2 is a drawing of a poppet valve actuated by a rocker arm and acted on by a camshaft having two cam profiles, i.e., cam profile switching used in the engine of FIG. 1.

Referring now to FIG. 2, a camshaft having cam profile switching (CPS) for use in the engine of FIG. 1 is shown. Camshaft 62 rotates around its axis at half crankshaft speed. Typically, camshaft 62 is coupled to a pulley (not shown) which is driven by a belt or a chain (also not shown) from the engine's crankshaft (not shown). When camshaft 62 rotates, camshaft lobe 66 (or 64, depending on the lateral position of camshaft 62 along its axis) pushes down on rocker arm 58. Rocker arm 58 is pivots around its axis. The lobe pushing on rocker arm 58 causes it to push down on poppet valve 60. In FIG. 2, valve 60 is in the closed position, by virtue of its valve spring holding it upward in the closed position. When valve 60 is depressed by engagement with either lobe 64 or lobe 66, valve 60 is forced downward away from the valve seat thereby allowing gases to flow past valve 60. As noted above, camshaft 62 has two cam lobes, 64 and 66. Cam lobe 66 is a more aggressive cam lobe which causes valve 60 to open farther and remain open for a longer duration. The type of valve event associated with cam lobe 66 is more appropriate for high speed, high torque engine operation when a maximum amount of airflow into the engine is desired. The less aggressive cam lobe 64 is appropriate for low speed, low torque engine operation when a shorter lift induces turbulence into the incoming air, which aids the ensuing combustion event. There is a mechanism (not shown), which laterally displaces camshaft 62 along its axis of rotation. In one axial (i.e., transverse) position, cam lobe 64 rides on rocker arm 58. In the other axial (i.e., transverse) position, cam lobe 66 rides on rocker arm 58. If the switching mechanism between these two transverse positions were to become stuck in the position with cam lobe 66 actuating valve 60, the engine would operate roughly at low speed, low torque operation. If the switching mechanism were to become stuck with cam lobe 64 actuating valve 60, engine peak power would be reduced somewhat and the combustion event would be harsh, i.e., high rate of pressure rise.

Referring again to FIG. 2, a variable valve timing (VVT) mechanism is similar to what is shown in FIG. 2, except the camshaft has only one lobe for actuating valve 60. That is, camshaft does not move axially. Instead, in VVT systems, the phasing of the camshaft 62 is shifted with respect to crankshaft rotation by rotating camshaft 62 about its axis, i.e., with respect to the engine's crankshaft (not shown). By changing the phasing of camshaft 62, the timing of the valve events are shifted temporally. The profile, including the open duration and the lift, remain fixed with such a system. Some VVT mechanisms are continuously variable devices capable of selecting any crank angle offset between two limits (maximum advance and maximum retard). Other VVT mechanisms are two-position devices allowing only an advanced position and a retarded position to be accessed. The present invention applies to both types of VVT devices. With the continuously variable device, however, the diagnostic is, in this example, performed at two distinct positions, within the allowable range, that have a significant enough phase shift to provide a detectable difference in exhaust temperature.

Two types of charge motion control (CMC) devices have been described herein which alter valve timing and/or lift and as such are charge motion control devices. The present invention applies to any kind of CMC device which can alter the valve event, e.g., electronic valve actuation, electrohydraulic valve actuation, variable valve lift, as examples.

A flowchart according to the present invention is shown in FIG. 3. The algorithm is stored as computer executable code in a storage medium, here, for example, in ROM 50 (FIG. 1). The process performed by execution of the stored code begins in step 80. In step 82, the charge motion control (CMC) device is commanded to assume a desired position. In some situations, step 82 is completed prior to entering the algorithm at step 80. The desired position is determined in another computer executed routine based on one or more of engine speed, engine coolant temperature, driver demanded torque, ambient temperature and pressure or other engine parameters. In step 84, the exhaust temperature is measured, Tm1. In step 86, an expected exhaust temperatures are computed for the CMC device being in one of the two commandable positions, here position Ts1, and for the CMC device being in the "other" of the two commandable positions, here position Ts2. These are computed in an engine model based on current engine parameters or found in a lookup table stored in ROM 50.

In step 88, it is determined whether |Tm1−Ts1| is greater than |Ts1−Ts2|/2. The vertical bars around the quantity Tm1−Ts2 signify absolute value. That nomenclature is used herein and in the Figures. If a negative result from step 88, the CMC device is determined to be operating properly and the diagnostic routine of FIG. 3 is exited at step 90.

If a positive result in step 88, additional tests are made to determine the cause of the improper operation of the CMC device. First control passes to steps 94 and 96 in which the CMC device is commanded to assume the "other" of the two commandable positions, i.e., not the desired position, and the resulting exhaust temperature, Tm2, is measured. Control passes to step 98 in which |Tm2−Tm1| is compared to a threshold temperature, $T_{thresh}$. If the absolute value of the difference is found to be less than $T_{thresh}$, a stuck CMC device is determined, step 100. A stuck CMC device indicates that the device is stuck in the first position, the second position, or in between the two positions. If it is stuck in one of the first or second positions, it may be ascertained which position it is in.

If, on the other hand, it is found to be greater, control passes to step 102 in which it is determined if |Tm1−Ts2| is less than |Ts1−Ts2|/2; if |Tm2−Ts1| is less than |Ts1−Ts2|/2; and if |Tm2−Ts2| is greater than |Ts1−Ts2|/2. If all three are true, it indicates a dislocated CMC device, step 104. If one or more of the tests are found to be false, CMC device is not dislocated and control passes to step 90 where the routine exits. A dislocated CMC device is one in which when commanded to a first position, the device is in the second position, or vice versa.

In another embodiment, a CMC device improper operation is based on the difference of a measured temperature, Tm, and an expected temperature, Ts, being greater than a threshold temperature. The threshold is selected large enough so that the possibility of a false detection is limited. In one example, the threshold temperature is 20 degrees Celsius. Alternatively, the threshold temperature is based on the engine operating condition.

In another embodiment, the CMC device is commanded to move between the two positions and a temperature measurement is taken at each position, Tm1 and Tm2. If the difference between the two temperatures is less than a predetermined temperature difference, improper operation of the CMC device is determined. The predetermined temperature difference, which is the expected change in temperature by moving the CMC device between its two positions, is 20 degrees Celsius. As stated above, a typical change in temperature caused by moving from one position to the other is typically more than 50 degrees Celsius. To ensure that false detections do not occur, the predetermined temperature difference is selected to be large enough to signify a difference in the presence of sensor noise, etc. but significantly less than that minimum difference.

While several modes for carrying out the invention have been described in detail, those familiar with the art to which this invention relates will recognize alternative designs and embodiments for practicing the invention. The above-described embodiments are intended to be illustrative of the invention, which may be modified within the scope of the following claims.

We claim:

1. A method for detecting improper operation of a charge motion control device in an internal combustion engine, the charge motion control device being capable of assuming at least two positions, the charge motion control device being commanded to assume a first of the two positions, comprising:

determining a measured exhaust temperature, Tm1;

determining a first expected exhaust temperature, Ts1, as a function of a present engine operating condition with the charge motion control device being in the first position; and detecting the improper operation as a function of said measured temperature and said first expected exhaust temperature.

2. The method of claim 1, further comprising:

determining a second expected exhaust temperature, Ts2, as a function of a present engine operating condition and the charge motion control device being in a second one of the positions; and detecting improper operation as a function of said second expected exhaust temperature.

3. The method of claim 2 wherein the improper operation is detected when |Tm1−Ts1|>|Ts1−Ts2|/2.

4. The method of claim 2 wherein said first and second expected temperatures are a function of engine models.

5. The method of claim 2 wherein said first and second expected temperatures are determined from lookup tables.

6. The method of claim 1 wherein said measured exhaust temperature is a function of a signal from a temperature sensor disposed in an engine exhaust.

7. The method of claim 1 wherein the improper operation is detected when |Tm1−Ts1|>dT, a threshold temperature.

8. The method of claim 1 wherein the threshold temperature is 20 degrees Celsius.

9. The method of claim 1 wherein the threshold temperature is a function of said present engine operating condition.

10. The method of claim 1, further comprising:

commanding the charge motion control device to assume the second one of the two positions;

determining a second measured exhaust temperature, Tm2, in response to commanding the charge motion control device to be in said second one of the positions; and basing the improper operation detection on said first and second measured temperatures.

11. The method of claim 10, further comprising: detecting improper operation when |Tm1−Tm2| is less than a predetermined temperature difference.

12. The method of claim 10 wherein said predetermined temperature difference is 20 degrees Celsius.

13. A system for detecting improper operation of a charge motion control device disposed in an internal combustion engine, the charge motion control device being capable of assuming a first position and a second position, comprising:

a temperature sensor disposed in an engine exhaust;

an electronic control unit operably coupled to the charge motion control device, the engine, and the temperature sensor, said electronic control unit commanding the charge motion control device to assume the first position, said electronic control unit determining a first expected exhaust temperature, Ts1, as a function of a present engine operating condition and said charge motion control device being in the first position, and said electronic control unit basing detection of the improper operation on said first expected exhaust temperature and a measured temperature, Tm1, determined from said temperature sensor.

14. The method of claim 13, the electronic control unit further determine a second expected exhaust temperature, Ts2, as a function of said present engine operating condition and said charge motion control device being in the second position wherein the improper operation is detected when |Tm1−Ts1|>|Ts1−Ts2|/2.

15. The method of claim 13, the electronic control unit further determining a second expected exhaust temperature, Ts2, as a function of said present engine operating condition and said charge motion control device being in the second position wherein the improper operation is detected when |Tm1−Ts1|>|Tm1−Ts2|/2.

16. The system of claim 13 wherein said charge motion control device is a cam profile switching device.

17. The system of claim 13 wherein said charge motion control device is a swirl control valve disposed in an engine intake.

18. A method for detecting improper operation of a charge motion control device in an internal combustion engine, the charge motion control device is capable of assuming a first position and a second position and is commanded to assume the first position, comprising:

determining a measured exhaust temperature, Tm1;

determining a first predicted exhaust temperature, Ts1, as a function of a present operating condition of the engine and said charge motion control device being in the first position;

determining a second predicted exhaust temperature, Ts2, as a function of said present operating condition of the engine and said charge motion control device being in the second position; and determination of such improper operation as a function of said measured exhaust temperature, said first predicted exhaust temperature, and said second predicted exhaust temperature.

19. The method of claim 18 wherein the improper operation is detected when |Tm1−Ts2|<|Ts1−Ts2|/2.

20. The method of claim 18 wherein the improper operation is detected when |Tm2−Ts1|<|Ts1−Ts2|/2.

21. The method of claim 18 wherein the improper operation is detected when |Tm2−Ts2|>|Ts1−Ts2|/2.

22. A method for detecting improper operation of a charge motion control device in an internal combustion engine, the charge motion control device being capable of assuming a first position and a second position and has been commanded to assume the first position, comprising:

determining a first measured exhaust temperature, Tm1;

commanding the charge motion control device to assume the second position;

determining a second measured exhaust temperature, Tm2, in response to commanding the charge motion control device to be in the second position; and determining improper operation as a function of said first and second measured temperatures.

23. The method of claim 22, further comprising: detecting improper operation when |Tm1−Tm2| is greater than dT, a predetermined temperature difference.

24. The method of claim 23 wherein said predetermined temperature difference, dT, is 20 degrees Celsius.

25. The method of claim 22, further comprising:

determining a first predicted exhaust temperature, Ts1, as a function of a present operating condition of the engine and said charge motion control device being in the first position;

determining a second predicted exhaust temperature, Ts2, as a function of said present operating condition of the engine and said charge motion control device being in the second position; and determining improper operation as a function when $|Tm2|Ts2|>|Ts1-Ts2|/2$.

26. The method of claim 22, comprising:

determining a first predicted exhaust temperature, Ts1, as a function of a present operating condition of the engine and said charge motion control device being in the first position;

determining a second predicted exhaust temperature, Ts2, as a function of said present operating condition of the engine and said charge motion control device being in the second position; and determining improper operation when $|Tm2-Ts1|<|Ts1-Ts2|/2$.

27. A computer readable storage medium having stored data representing instructions executable by a computer to detect improper operation of a charge motion control device in an internal combustion engine, the charge motion control device being capable of assuming at least two positions, the charge motion control device being commanded to assume a first of the two positions, comprising:

instructions to determine a measured exhaust temperature, Tm1;

instructions to determine a first expected exhaust temperature, Ts1, as a function of a present engine operating condition with the charge motion control device being in the first position; and instructions to detect the improper operation as a function of said measured temperature and said first expected exhaust temperature.

28. The storage media of claim 27, further comprising:

instructions to determine a second expected exhaust temperature, Ts2, as a function of a present engine operating condition and the charge motion control device being in a second one of the positions; and instructions to detect improper operation as a function of said second expected exhaust temperature.

29. The storage media of claim 28, further comprising:

instructions to command the charge motion control device to assume a second of the two positions;

instructions to determine a second measured exhaust temperature when the charge motion control device is in said second position, Tm2; and instructions to detect improper operation as a function of said second measured exhaust temperature.

* * * * *